United States Patent
Salter et al.

(10) Patent No.: US 9,463,737 B2
(45) Date of Patent: Oct. 11, 2016

(54) ILLUMINATED SEATBELT ASSEMBLY

(71) Applicant: Ford Global Technologies, LLC, Dearborn, MI (US)

(72) Inventors: Stuart C. Salter, White Lake, MI (US); James J. Surman, Clinton Township, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/728,385

(22) Filed: Jun. 2, 2015

(65) Prior Publication Data

US 2015/0266417 A1    Sep. 24, 2015

Related U.S. Application Data

(63) Continuation-in-part of application No. 14/603,636, filed on Jan. 23, 2015, which is a continuation-in-part of application No. 14/086,442, filed on Nov. 21, 2013.

(51) Int. Cl.

| | |
|---|---|
| B60Q 1/00 | (2006.01) |
| B60Q 1/26 | (2006.01) |
| B60Q 3/02 | (2006.01) |
| F21V 9/16 | (2006.01) |
| F21K 99/00 | (2016.01) |
| B60Q 3/00 | (2006.01) |
| B60R 22/18 | (2006.01) |
| H05B 37/02 | (2006.01) |
| A44B 11/25 | (2006.01) |

(52) U.S. Cl.
CPC ......... *B60Q 3/0243* (2013.01); *A44B 11/2565* (2013.01); *B60Q 3/008* (2013.01); *B60Q 3/0293* (2013.01); *B60R 22/18* (2013.01); *F21K 9/56* (2013.01); *F21V 9/16* (2013.01); *H05B 37/0218* (2013.01); *H05B 37/0227* (2013.01); *Y02B 20/46* (2013.01)

(58) Field of Classification Search
CPC A44B 11/2565; B60Q 3/008; B60Q 3/0423; B60Q 3/0293; B60R 22/18; B60R 2022/1806; B60R 2022/1812; F21K 9/56; F21V 9/16; H05B 37/0218; H05B 37/0227
USPC ................................ 362/487–488, 509–510
See application file for complete search history.

(56) References Cited

U.S. PATENT DOCUMENTS

| | | | |
|---|---|---|---|
| 4,899,424 A | * | 2/1990 | Barnes ............... A44B 11/2523 24/637 |
| 5,709,453 A | | 1/1998 | Krent et al. |
| 5,892,436 A | | 4/1999 | Blackburn et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason Moon Han
(74) *Attorney, Agent, or Firm* — Vichit Chea; Price Heneveld LLP

(57) ABSTRACT

A lighting system for a vehicle seatbelt assembly is provided herein. The lighting system includes a first seatbelt component configured to couple to a second seatbelt component. A light source is disposed on the first seatbelt component. A photoluminescent structure is disposed on the second component and is configured to luminesce in response to excitation by the light source.

20 Claims, 13 Drawing Sheets

(56) References Cited

U.S. PATENT DOCUMENTS

| | | |
|---|---|---|
| 6,117,362 A | 9/2000 | Yen et al. |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,773,012 B2 | 7/2014 | Ryu et al. |
| 8,846,184 B2 | 9/2014 | Agrawal et al. |
| 8,952,341 B2 | 2/2015 | Kingsley et al. |
| 9,057,021 B2 | 6/2015 | Kingsley et al. |
| 9,065,447 B2 | 6/2015 | Buttolo et al. |
| 9,299,887 B2 | 3/2016 | Lowenthal et al. |
| 2001/0033492 A1* | 10/2001 | Rogers ................. B60Q 3/004 362/483 |
| 2002/0122307 A1 | 9/2002 | Ellis et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0239853 A1 | 9/2012 | Moshayedi |
| 2012/0280528 A1 | 11/2012 | Dellock et al. |
| 2013/0335994 A1 | 12/2013 | Mulder et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 202004007872 U1 | 9/2004 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

* cited by examiner

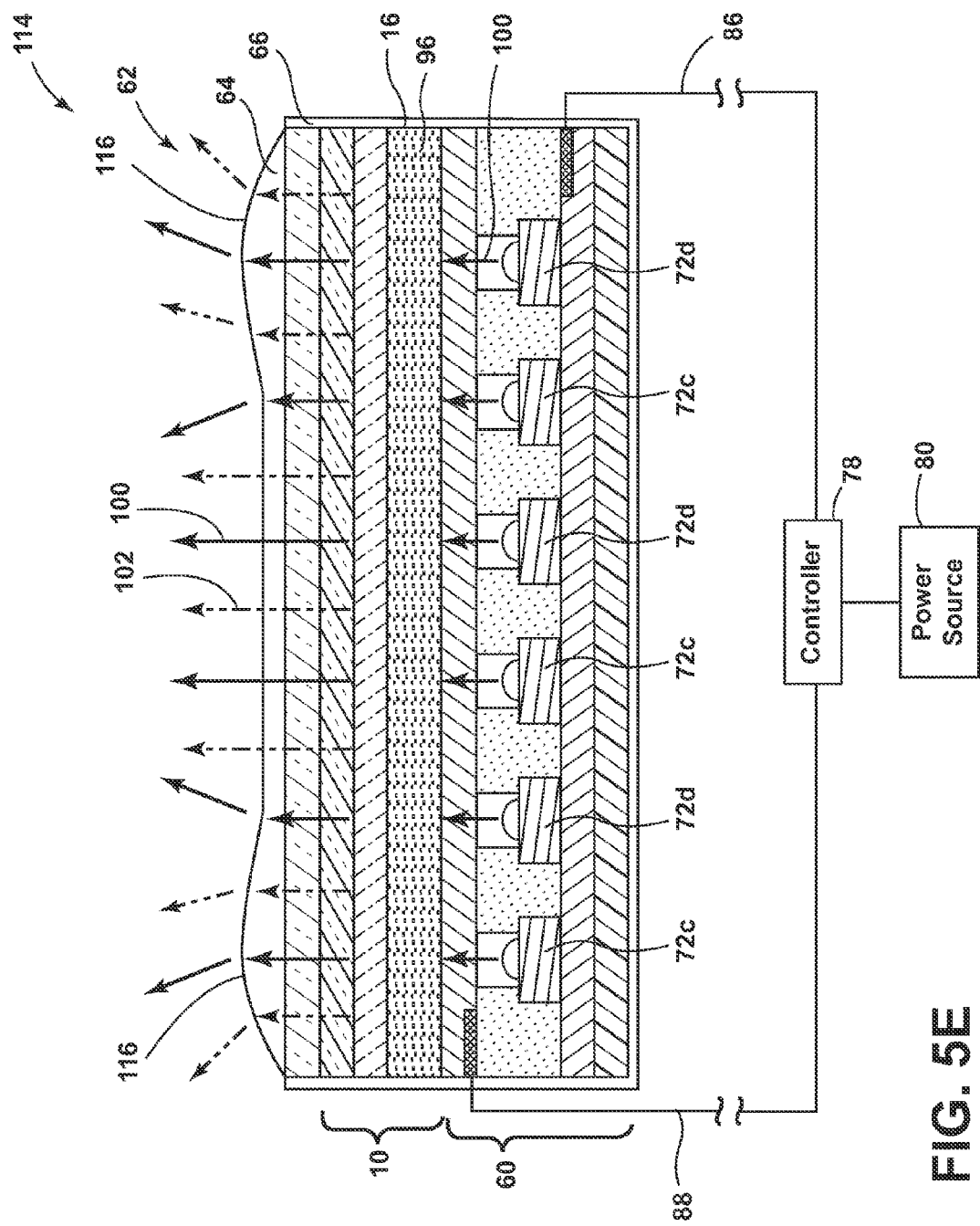

ILLUMINATED SEATBELT ASSEMBLY

CROSS-REFERENCE TO RELATED APPLICATIONS

This application is a continuation-in-part of U.S. patent application Ser. No. 14/603,636, filed Jan. 23, 2015, entitled "DOOR ILLUMINATION AND WARNING SYSTEM" which is a continuation-in-part of U.S. patent application Ser. No. 14/086,442, filed Nov. 21, 2013, entitled "VEHICLE LIGHTING SYSTEM WITH PHOTOLUMINESCENT STRUCTURE." The aforementioned related applications are hereby incorporated by reference as if fully set forth herein.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a vehicle seatbelt assembly is provided. The seatbelt assembly includes a first seatbelt component configured to couple to a second seatbelt component. A light source is disposed on the first seatbelt component. A first photoluminescent structure is disposed on the second component configured to luminesce in response to excitation by the light source.

According to another aspect of the present invention, A seatbelt assembly for a vehicle is provided. The seatbelt assembly includes a tongue member slidably disposed along a retractable belt webbing for movement about a vehicle interior. A seatbelt buckle includes a housing containing a latch mechanism which releasably latches the tongue member to the seatbelt buckle. A light source is disposed on the housing. A luminescent structure is configured to luminesce in response to excitation by light emitted by the light source.

According to yet another aspect of the present invention, a seatbelt assembly is provided. The assembly includes a first seatbelt component disposed on a retractable belt webbing for movement about an interior of a vehicle. A second seatbelt component includes a housing containing a latch mechanism. One or more light sources is disposed within the vehicle interior and directed towards a photoluminescent structure disposed on the first or second seatbelt components. The photoluminescent structures are configured to luminesce in response to excitation by the light source.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 5E is a cross-sectional view taken along line III-III of FIG. 2 illustrating an alternate light source having a luminescent structure disposed on the light source configured to convert a portion of light emitted from the light source from a first wavelength to a second wavelength, according to one embodiment;

DETAILED DESCRIPTION OF THE PREFERRED EMBODIMENTS

Figure 2:
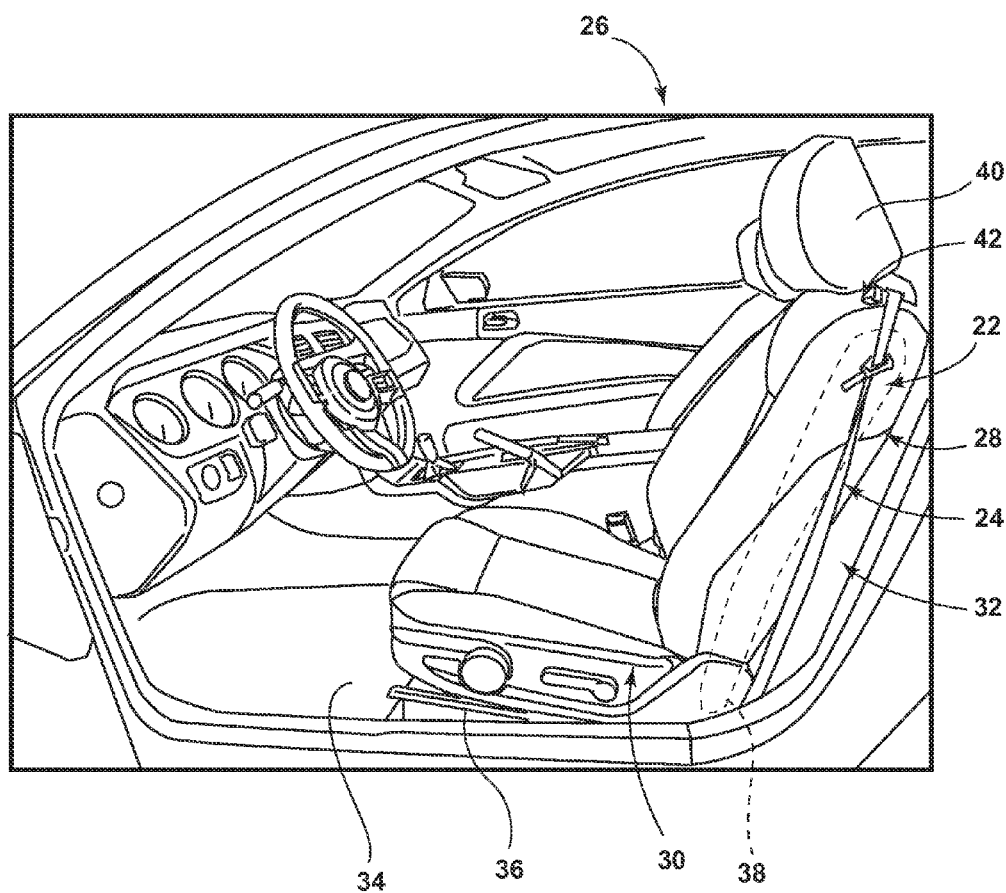
FIG. 2 is a perspective view of the lighting assembly employed on a driver's seat according to one embodiment.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting system implemented as an illuminated seatbelt assembly for a vehicle. The seatbelt assembly may advantageously employ one or more photoluminescent structures to illuminate in response to pre-defined events. The one or more photoluminescent structures may be configured to convert light received from an associated light source and re-emit the light at a different wavelength typically found in the visible spectrum.

Figure 1A:
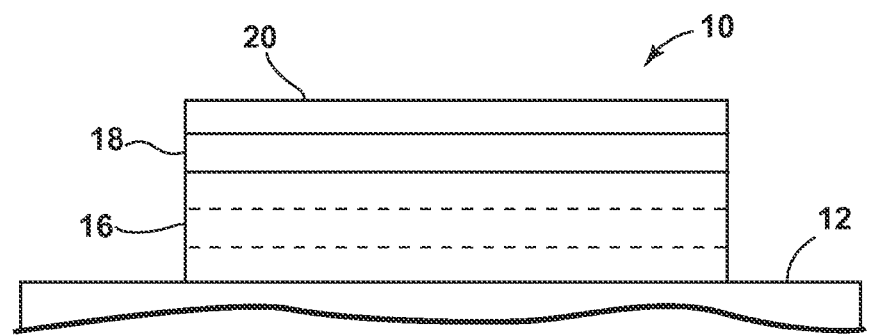
FIG. 1A is a side view of a photoluminescent structure rendered as a coating for use in a luminescent seatbelt assembly according to one embodiment.
Figure 1B:
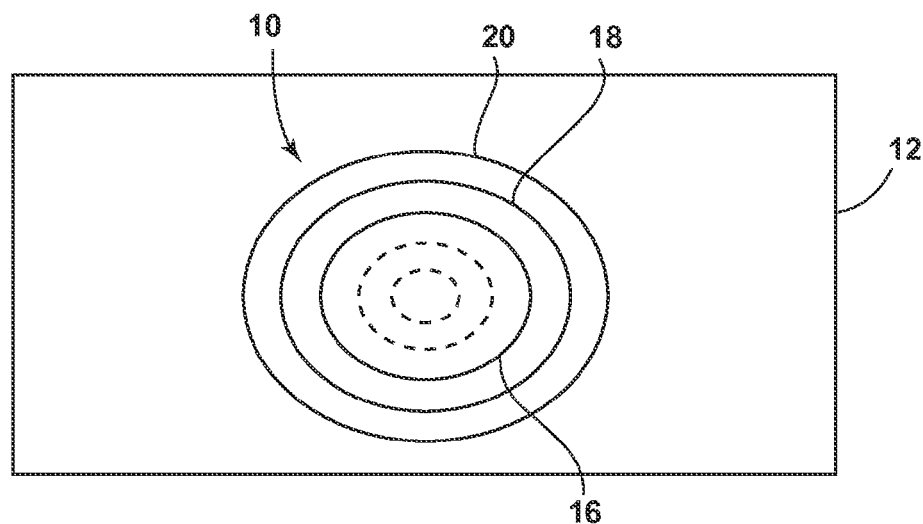
FIG. 1B is a top view of a photoluminescent structure rendered as a discrete particle according to one embodiment.
Figure 1C:
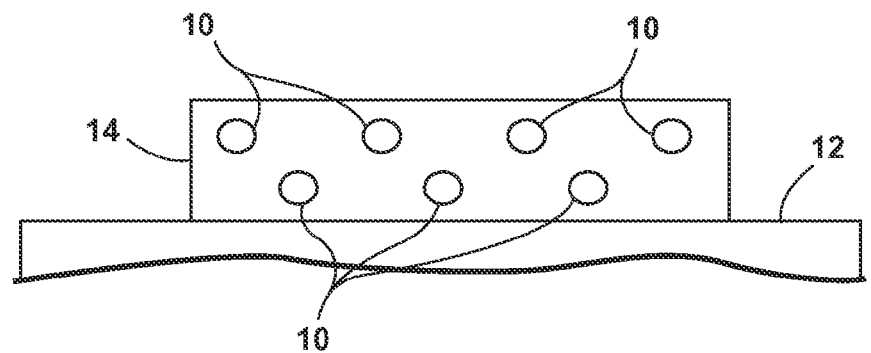
FIG. 1C is a side view a plurality photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g. a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g. a film) that may then be applied (as shown) or integrated with the substrate 12.

At the most basic level, a given photoluminescent structure 10 includes an energy conversion layer 16 that may include one or more sub layers, which are exemplarily shown through broken lines in FIGS. 1A and 1B. Each sub layer of the energy conversion layer 16 may include one or more photoluminescent materials having energy converting elements with phosphorescent or fluorescent properties. Each photoluminescent material may become excited upon receiving light of a specific wavelength, thereby causing the light to undergo a conversion process. Under the principle of down conversion, the inputted light is converted into a longer wavelength light that is outputted from the photoluminescent structure 10. Conversely, under the principle of up conversion, the inputted light is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

In some embodiments, light that has been down converted or up converted may be used to excite other photoluminescent material(s) found in the energy conversion layer 16. The process of using converted light outputted from one photoluminescent material to excite another, and so on, is generally known as an energy cascade and may serve as an alternative for achieving various color expressions. With respect to either conversion principle, the difference in wavelength between the exciting light and the converted light is known as the Stokes shift and serves as the principle driving mechanism for an energy conversion process corresponding to a change in wavelength of light. In the various implementations discussed herein, each of the photoluminescent structures may operate under either conversion principle.

The energy conversion layer 16 may be prepared by dispersing the photoluminescent material in a polymer matrix to form a homogenous mixture using a variety of methods. Such methods may include preparing the energy conversion layer 16 from a formulation in a liquid carrier medium and coating the energy conversion layer 16 to a desired substrate. The energy conversion layer 16 may be applied to a substrate by painting, screen printing, spraying, slot coating, dip coating, roller coating, and bar coating. Alternatively, the energy conversion layer 16 may be prepared by methods that do not use a liquid carrier medium. For example, the energy conversion layer 16 may be rendered by dispersing the photoluminescent material into a solid state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate using any methods known to those skilled in the art. When the energy conversion layer 16 includes sub layers, each sub layer may be sequentially coated to form the energy conversion layer 16. Alternatively, the sub layers can be separately prepared and later laminated or embossed together to form the energy conversion layer 16. Alternatively still, the energy conversion layer 16 may be formed by coextruding the sub layers.

Referring back to FIGS. 1A and 1B, the photoluminescent structure 10 may optionally include at least one stability layer 18 to protect the photoluminescent material contained within the energy conversion layer 16 from photolytic and thermal degradation. The stability layer 18 may be configured as a separate layer optically coupled and adhered to the energy conversion layer 16. Alternatively, the stability layer 18 may be integrated with the energy conversion layer 16. The photoluminescent structure 10 may also optionally include a protection layer 20 optically coupled and adhered to the stability layer 18 or other layer (e.g., the conversion layer 16 in the absence of the stability layer 18) to protect the photoluminescent structure 10 from physical and chemical damage arising from environmental exposure. The stability layer 18 and/or the protective layer 20 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM," filed Jun. 5, 2009; U.S. Pat. No. 8,247,761 to Agrawal et al., entitled "PHOTOLUMINESCENT MARKINGS WITH FUNCTIONAL OVERLAYERS," filed Oct. 19, 2011; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Mar. 4, 2013; U.S. Pat. No. 8,664,624 B2 to Kingsley et al., entitled "ILLUMINATION DELIVERY SYSTEM FOR GENERATING SUSTAINED SECONDARY EMISSION," filed Nov. 14, 2012; U.S. Patent Publication No. 2012/0183677 to Agrawal et al., entitled "PHOTOLUMINESCENT COMPOSITIONS, METHODS OF MANUFACTURE AND NOVEL USES," filed Mar. 29, 2012; U.S. Patent Publication No. 2014/0065442 A1 to Kingsley et al., entitled "PHOTOLUMINESCENT OBJECTS," filed Oct. 23, 2012; and U.S. Patent Publication No. 2014/0103258 A1 to Agrawal et al., entitled "CHROMIC LUMINESCENT COMPOSITIONS AND TEXTILES," filed Dec. 19, 2013, all of which are incorporated herein by reference in their entirety.

Referring now to FIG. 2, a lighting system 22 is disposed within a seatbelt assembly 24 of a vehicle 26 that is configured to illuminate an area proximate a seating assembly 28 and/or components thereof, according to one embodiment. The seating assembly 28 includes a seat 30 pivotally coupled with a seatback 32. The seat 30 is slidably coupled with a floor 34 of the vehicle 26 about a track assembly 36. The track assembly 36 is configured to allow the vehicle seating assembly 28 to be adjusted in a forward and a rearward direction relative to the vehicle 26. It is understood that the seating assembly 28 may be positioned at various locations through the vehicle 26 other than the illustrated position, such as passenger side location, a mid-row location, and rear seat location. It is also conceivable that the seat 30 may not include the track assembly 36 and may be otherwise movably attached to the vehicle 26, or alternatively may be fixedly coupled with the floor 34 of the vehicle 26. Further, it should be appreciated that the lighting system 22 described herein may be utilized on any portion of any seating assembly 28 disposed within a vehicle 26.

The seatback 32 of the seating assembly 28 may include side supports 38 that pivotally couple with a rear portion of the seat 30 and extend upward from the seat 30 to a top portion of the seatback 32. The seatback 32 also includes a cushion and an upholstery material disposed over the cushion substantially enclosing the seatback 32. A headrest 40 may be removably and adjustably coupled with the top portion of the seatback 32 and may be substantially centered therein. Accordingly, an attachment structure 42 for the headrest 40 may include the seatback 32 and more specifically, the upper portion of the seatback 32. It should be appreciated that the seatbelt assembly 24 described herein may be utilized for any vehicle 26 such as, but not limited to, coupes, sedans, trucks, sport utility, vans, and the like. Further, it should be appreciated that any lighting system 22 found elsewhere on the vehicle 26 may also be manufactured in accordance with the principles of the present disclosure.

Figure 3:
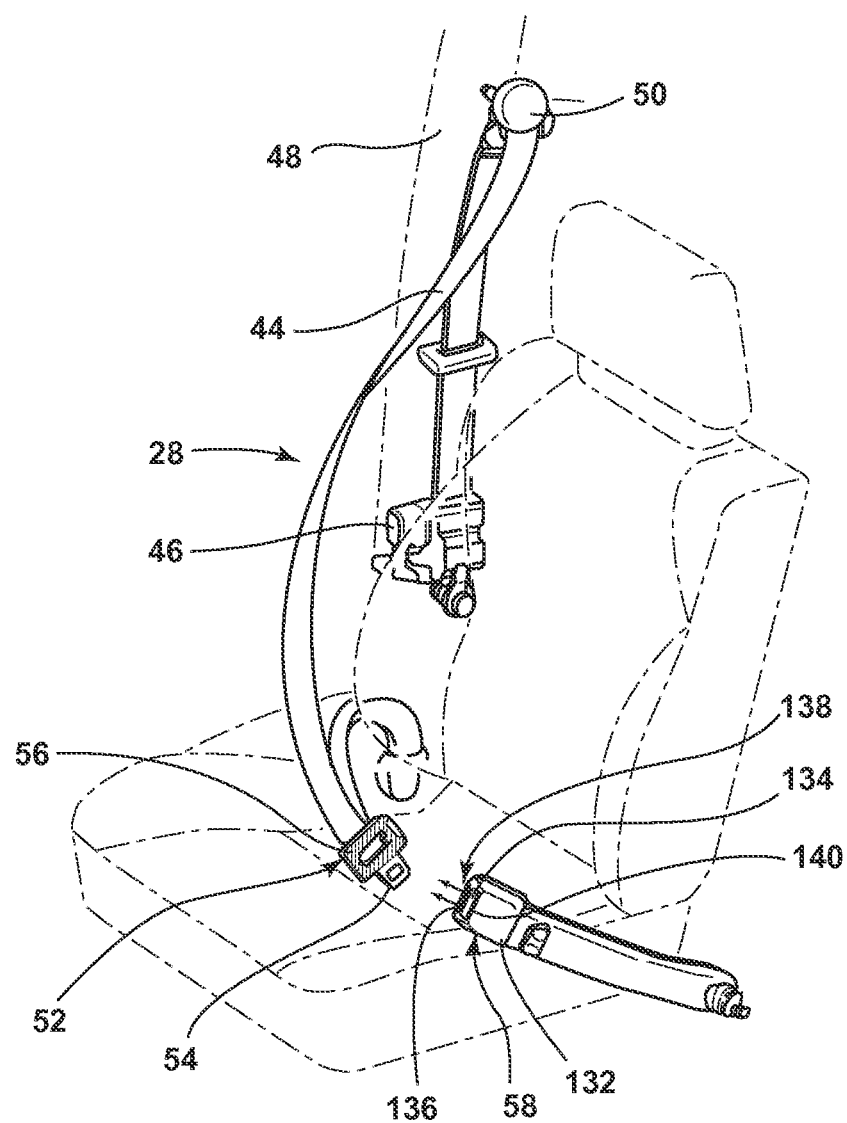
FIG. 3 is a perspective side view of a passenger seat disposed within a vehicle interior with a seatbelt assembly in an unlatched condition employing the lighting system according to one embodiment.

As shown in FIG. 3, the seatbelt assembly 24 includes a belt webbing 44 that is coupled to the seating assembly 28 or the vehicle 26 at one end and further coupled to a retractor 46 disposed within a B-pillar 48 of the vehicle 26 at the opposing end. The retractor 46 may also be located externally to the B-pillar 48 of the vehicle 26, and it is further contemplated that separate belt webbing 44 may be coupled to the vehicle seat 30 or the vehicle 26 using a second retractor 46 in a dual retractor system. The B-pillar 48 is generally disposed between a front passenger door and a rear passenger side door. As coupled to the retractor 46, the belt webbing 44 is retractable thereby allowing a vehicle occupant to move a seatbelt assembly 24 component for latching the seatbelt assembly 24. It should be appreciated that any other seatbelt orientation may also be utilized for implementation of the lighting system 22 described herein.

In the embodiment shown in FIG. 3, the belt webbing 44 is coupled to a D-ring 50, or turning loop, which may be vertically adjustable along the B-pillar 48 for accommodating various vehicle occupants. The seatbelt assembly 24 further includes a tongue member 52 which is operably coupled to the belt webbing 44 and may be slidable along the belt webbing 44 for adjustable movement therealong. The tongue member includes a buckle portion 54 and a mounting portion 56. The mounting portion 56 is coupled to and slidable along a portion of the belt webbing 44. The buckle portion 54 is configured to releasably couple to a seatbelt buckle 58 for restraining an occupant within the vehicle 26.

The seatbelt buckle 58 includes a housing 132 having an upper side that includes a latch mechanism 134 which is configured to releasably couple the seatbelt tongue buckle portion 54 to the seatbelt buckle 58. The buckle 58 also includes a tongue receiving slot 136 that may be surrounded by a funneling feature 138 that completely surrounds the receiving slot 136 and serves as a guide for urging a buckle portion 54 into the receiving slot 136. The buckle housing 132, and funneling feature 138, may be comprised of a rigid polymeric material in assembly. For latching the seatbelt assembly 24, a user may grasp the seatbelt buckle 58, and pull the retractable belt webbing 44 outwardly a distance necessary to bring the seatbelt buckle 58 into contact with the tongue member 52. In this way, the seatbelt buckle 58 and the tongue member 52 are moveably associated with one another between a latched condition and an unlatched condition.

Figure 7:
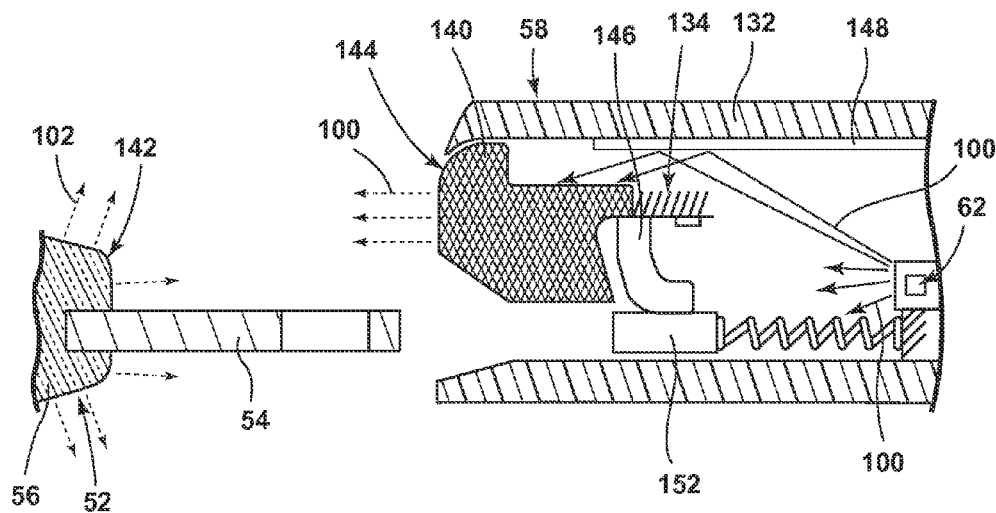
FIG. 7 is a cross-sectional view taken along line VII-VII of FIG. 4A illustrating the lighting system with the seatbelt assembly in the unlatched condition utilizing a single light source.

An actuator 146 that is controlled through manually depressible pushbutton 140 is shown in FIG. 7 molded into a surface of the buckle 58 to release the seatbelt buckle 58 from the seatbelt tongue buckle portion 54 thereby releasing the latch mechanism 134 disposed within the housing 132 of the seatbelt buckle 58.

Figure 4A:
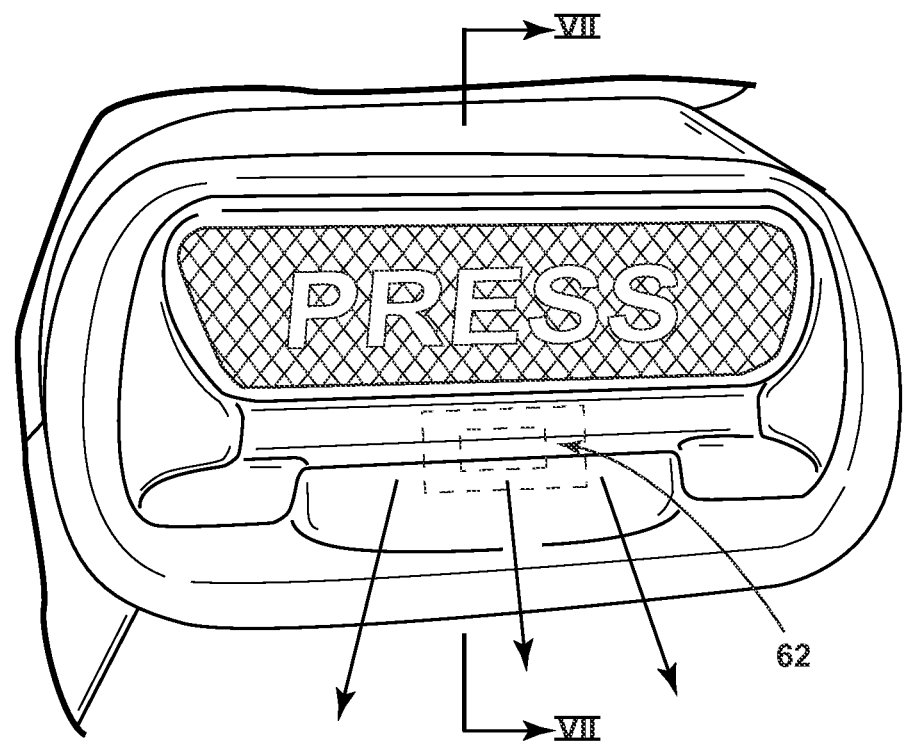
FIG. 4A is a top view of a seatbelt buckle emitting light through the receiving slot.
Figure 4B:
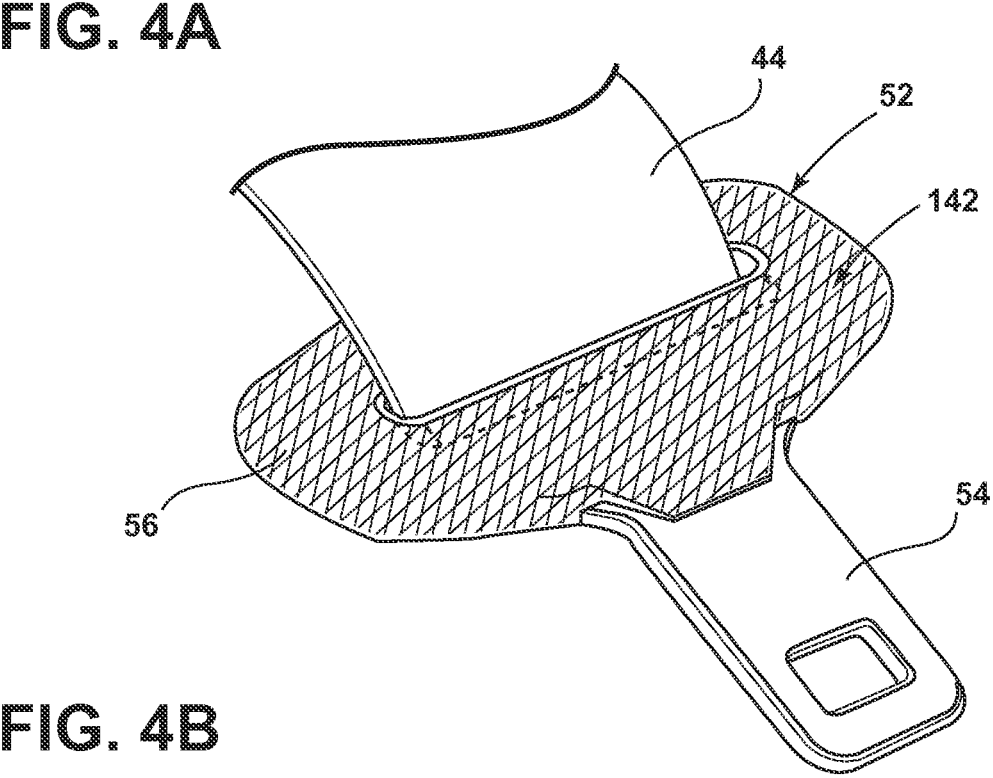
FIG. 4B is a perspective view of a tongue member having a photoluminescent structure disposed therein.

Referring to FIGS. 4A-B, the lighting system 22 may include a light source 62 disposed within the buckle 58 and a photoluminescent portion 142 disposed on the tongue member 52. The light source 62 may be over molded, or otherwise attached, to a portion of the seatbelt assembly 24, such as an inner portion of the buckle housing 132. According to the embodiment illustrated in FIG. 3, a portion of the buckle housing 132 and the light source 62 are placed in a mold simultaneously and an overmold material 66 is disposed over the combination of the housing 132 and light source 62. In embodiments where the overmold material 66 is cured under pressure, the overmold material 66 may be applied to the cover stock in a partly-cured condition. In one embodiment the over molding process includes applying the overmold material 66 onto at least a part of over the combination of the seatbelt assembly 24 and light source 62 by spraying, brushing, dipping, printing, laminating or rolling, followed by curing the overmold material 66. Such a process results in the seatbelt assembly 24 and light source 62 being coupled to one another. In some embodiments, the overmold material 66 may include a plastic, silicon, urethane material, or any other material that may be advantageous or structurally sound.

According to one embodiment, the light source 62 includes a flexible circuit board (e.g., a copper flexible circuit) that is coupled to an inner portion of a seatbelt buckle 58. In such an arrangement, the flexible circuit board may flex in conjunction with the inner portion to allow the lighting system 22 to be contoured to match the geometry of the housing 132.

The photoluminescent portion 142 contains at least one photoluminescent material 96 and is configured to illuminate light in response to light emitted from the light source 62. The light source 62 may be powered using a vehicle power source 80. Additionally, the light source 62 may include one or more light emitting diodes (LED) and may also include optics configured to disperse or focus light being emitted therefrom. For example, optics may be utilized for directing a first portion of light emitted from the light source 62 through the receiving slot 136 towards the tongue member 52. A second portion of light emitted from the light source 62 may be directed towards a feature on the buckle 58 and/or any components disposed therein. It should be appreciated that the light source 62 may be located on any surface of any seatbelt component, which includes, but is not limited to, the tongue member 52, the buckle 58, the belt webbing 44, the D-ring 50, and/or the retractor 46.

Referring to FIG. 4B, the photoluminescent portion 142 may be applied or otherwise arranged on the tongue member 52. More specifically, light emitted from the light source 62 may be converted by the photoluminescent portion 142 and re-emitted as light having a different wavelength, typically in the visible spectrum. Such a configuration may assist an occupant of the vehicle 26 in attaching their seatbelt to the appropriate location when the lighting system 22 is in the illuminated state. The light source 62 is configured to output a first wavelength of light. In response to receiving the light at the first wavelength, any photoluminescent portion 142 may become illuminated and emit light at least at a second wavelength, as described above. It is contemplated that the lighting system 22, more particularly, the light source 62, may direct light towards a wide range of target locations such that the lighting system 22 may be used for a plurality of functions. Exemplary functions include usage as an entry lamp, ambient lighting, assisting in functions such as buckling the seatbelt, and/or a seat pocket lamp.

Figure 5A:
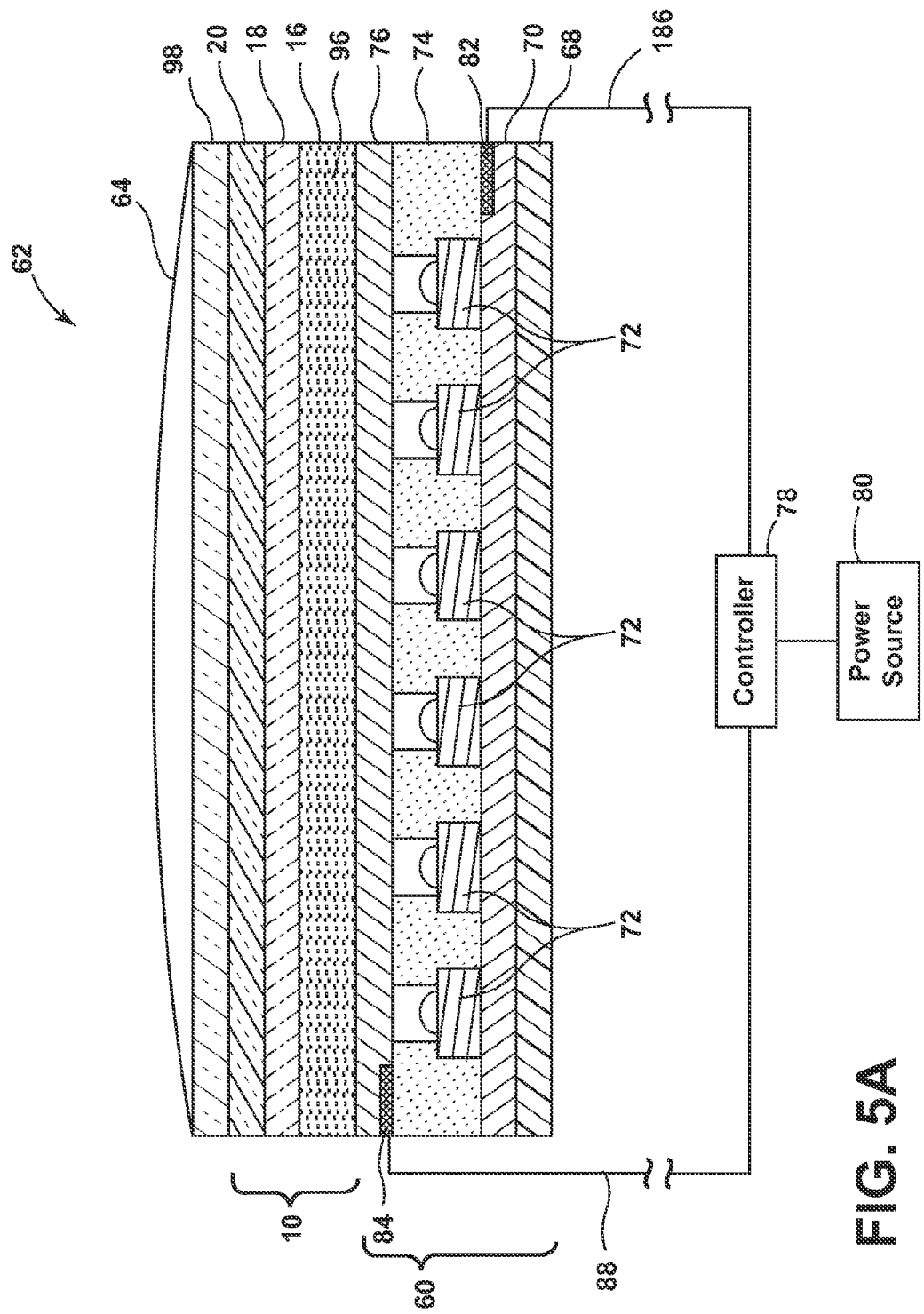
FIG. 5A is a cross-sectional view taken along line III-III of FIG. 2 illustrating a light source according to one embodiment.

In some embodiments, a plurality of photoluminescent portions 142, 144 may be disposed within the lighting system 22. Each of the plurality of photoluminescent portions 142, 144 may incorporate one or more photoluminescent structures 10 configured to emit a specific color light in response to the excitation generated in response to the light emitted from the light source 62. In some embodiments, a combination of photoluminescent structures 10 may be utilized within the photoluminescent portions 142, 144 to output various wavelengths corresponding to different colors of light Referring to FIGS. 5A-5E, a cross-sectional view of the light source 62 capable of use on a vehicle 26 with a photoluminescent structure 10 is shown according to one embodiment. As illustrated in FIG. 5A, the light source 62 may have a stacked arrangement that includes a light-producing assembly 60, a photoluminescent structure 10, a viewable portion 64, and an overmold material 66. It should be appreciated that the viewable portion 64 and the overmold material 66 may be two separate components, or may be integrally formed as a single component.

The light-producing assembly 60 may correspond to a thin-film or printed light emitting diode (LED) assembly and includes a substrate 68 as its lowermost layer. The substrate 68 may include a polycarbonate, poly-methyl methacrylate (PMMA), or polyethylene terephthalate (PET) material on the order of 0.005 to 0.060 inches thick and is arranged over the intended vehicle 26 surface on which the light source 62 is to be received (e.g., buckle housing 132). Alternatively, as a cost saving measure, the substrate 68 may directly correspond to a preexisting vehicle structure (e.g., buckle housing 132, exterior panels, and/or interior panels).

The light-producing assembly 60 includes a positive electrode 70 arranged over the substrate 68. The positive electrode 70 includes a conductive epoxy such as, but not limited to, a silver-containing or copper-containing epoxy. The positive electrode 70 is electrically connected to at least a portion of a plurality of LED sources 72 arranged within a semiconductor ink 74 and applied over the positive electrode 70. Likewise, a negative electrode 76 is also electrically connected to at least a portion of the LED sources 72. The negative electrode 76 is arranged over the semiconductor ink 74 and includes a transparent or translucent conductive material such as, but not limited to, indium tin oxide. Additionally, each of the positive and negative electrodes 70, 76 are electrically connected to a controller 78 and a power source 80 via a corresponding bus bar 82, 84 and conductive leads 86, 88. The bus bars 82, 84 may be printed along opposite edges of the positive and negative electrodes 70, 76 and the points of connection between the bus bars 82, 84 and the conductive leads 86, 88 may be at opposite corners of each bus bar 82, 84 to promote uniform current distribution along the bus bars 82, 84. It should be appreciated that in alternate embodiments, the orientation of components within the light-producing assembly 60 may be altered without departing from the concepts of the present disclosure. For example, the negative electrode 76 may be disposed below the semiconductor ink 74 and the positive electrode 70 may be arranged over the aforementioned semiconductor ink 74. Likewise, additional components, such as the bus bars 82, 84 may also be placed in any orientation such that the light-producing assembly 60 may emit light towards a desired location.

The LED sources 72 may be dispersed in a random or controlled fashion within the semiconductor ink 74 and may be configured to emit focused or non-focused light toward the photoluminescent structure 10. The LED sources 72 may correspond to micro-LEDs of gallium nitride elements on the order of about 5 to about 400 microns in size and the semiconductor ink 74 may include various binders and dielectric material including, but not limited to, one or more of gallium, indium, silicon carbide, phosphorous, and/or translucent polymeric binders.

The semiconductor ink 74 can be applied through various printing processes, including ink jet and silk screen processes to selected portion(s) of the positive electrode 70. More specifically, it is envisioned that the LED sources 72 are dispersed within the semiconductor ink 74, and shaped and sized such that a substantial quantity of the LED sources 72 align with the positive and negative electrodes 70, 76 during deposition of the semiconductor ink 74. The portion of the LED sources 72 that ultimately are electrically connected to the positive and negative electrodes 70, 76 may be illuminated by a combination of the bus bars 82, 84, controller 78, power source 80, and conductive leads 86, 88. According to one embodiment, the power source 80 may correspond to a vehicular power source 80 operating at 12 to 16 VDC. Additional information regarding the construction of light-producing assemblies is disclosed in U.S. Patent Publication No. 2014/0264396 A1 to Lowenthal et al., entitled "ULTRA-THIN PRINTED LED LAYER REMOVED FROM SUBSTRATE," filed Mar. 12, 2014, the entire disclosure of which is incorporated herein by reference.

Referring still to FIG. 5A, the photoluminescent structure 10 is arranged over the negative electrode 76 as a coating, layer, film or other suitable deposition, as described above. With respect to the presently illustrated embodiment, the photoluminescent structure 10 may be arranged as a multi-layered structure including an energy conversion layer 16, optional stability layer 18, and optional protection layer 20.

As described above, the energy conversion layer 16 includes at least one photoluminescent material 96 having energy converting elements with phosphorescent or fluorescent properties. For example, the photoluminescent material 96 may include organic or inorganic fluorescent dyes including rylenes, xanthenes, porphyrins, phthalocyanines. Additionally, or alternatively, the photoluminescent material 96 may include phosphors from the group of Ce-doped garnets such as YAG:Ce.

With continued reference to FIG. 5A, the viewable portion 64 is arranged over the photoluminescent structure 10. In some embodiments, the viewable portion 64 may include a plastic, silicon, or urethane material and is molded over the photoluminescent structure 10 and light-producing assembly 60. Preferably, the viewable portion 64 should be at least partially light transmissible. In this manner, the viewable portion 64 will be illuminated by the photoluminescent structure 10 whenever an energy conversion process is underway. Additionally, by over-sealing the viewable portion 64, it may also function to protect the photoluminescent structure 10 and the light-producing assembly 60. The viewable portion 64 may be arranged in a planar shape and/or an arcuate shape to enhance its viewing potential when in a luminescent state. Like the photoluminescent structure 10 and the light-producing assembly 60, the viewable portion 64 may also benefit from a thin design, thereby helping to fit the light source 62 into small package spaces of the vehicle 26.

In some embodiments, a decorative layer 98 may be disposed between the viewable portion 64 and the photoluminescent structure 10. The decorative layer 98 may include a polymeric material or other suitable material and is configured to control or modify an appearance of the viewable portion 64 of the light source 62. For example, the decorative layer 98 may be similar in color to that of the buckle 58 so that the lighting system 22 is substantially hidden when in the unilluminated state. In any event, the decorative layer 98 should be at least partially light transmissible such that the photoluminescent structure 10 is not prevented from illuminating the viewable portion 64 whenever an energy conversion process is underway.

The overmold material 66 may be disposed around the light-producing assembly 60 and/or photoluminescent structure 10. The overmold material 66 may protect the light-producing assembly 60 from a physical and chemical damage arising from environmental exposure. The overmold material 66 may have viscoelasticity (i.e., having both viscosity and elasticity), a low Young's modulus, and/or a high failure strain compared with other materials so that the overmold material 66 may protect the light-producing assembly 60 when contact is made thereto. For example, the overmold material 66 may protect the light-producing assembly 60 from the repetitive strikes that may occur when the occupants ingress and egress from the vehicle 26.

Figure 5B:
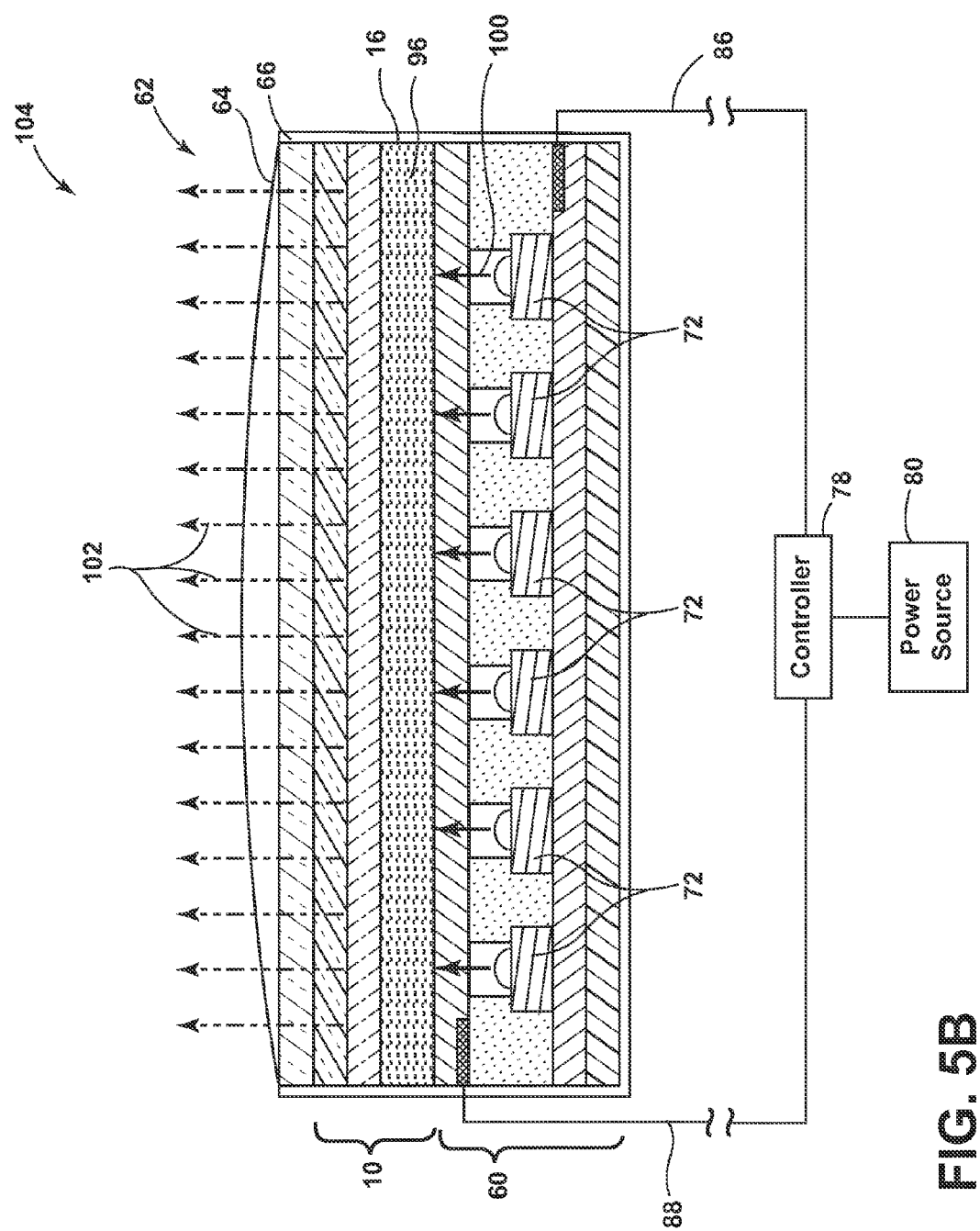
FIG. 5B is a cross-sectional view taken along line III-III of FIG. 2 further illustrating an the light source, according to one embodiment.

Referring to FIG. 5B, an energy conversion process 104 for producing single color luminescence is illustrated according to one embodiment. For purposes of illustration, the energy conversion process 104 is described below using the light source 62 depicted in FIG. 5A. In this embodiment, the energy conversion layer 16 of the photoluminescent structure 10 includes a single photoluminescent material 96, which is configured to convert inputted light 100 received from LED sources 72 into an outputted light 102 having a wavelength different than that associated with the inputted light 100. More specifically, the photoluminescent material 96 is formulated to have an absorption spectrum that includes the emission wavelength of the inputted light 100 supplied from the LED sources 72. The photoluminescent material 96 is also formulated to have a Stokes shift resulting in the converted visible light 102 having an emission spectrum expressed in a desired color, which may vary per lighting application. The converted visible light 102 is outputted from the light source 62 via the viewable portion 64, thereby causing the viewable portion 64 to illuminate in the desired color. In one embodiment, the energy conversion process is undertaken by way of down conversion, whereby the inputted light 100 includes light on the lower end of the visibility spectrum such as blue, violet, or ultraviolet (UV) light. Doing so enables blue, violet, or UV LEDs to be used as the LED sources 72, which may offer a relative cost advantage over simply using LEDs of the desired color and foregoing the energy conversion, process altogether. Furthermore, the illumination provided by the viewable portion 64 may offer a unique, substantially uniform, and/or attractive viewing experience that may be difficult to duplicate through non-photoluminescent means.

Figure 5C:
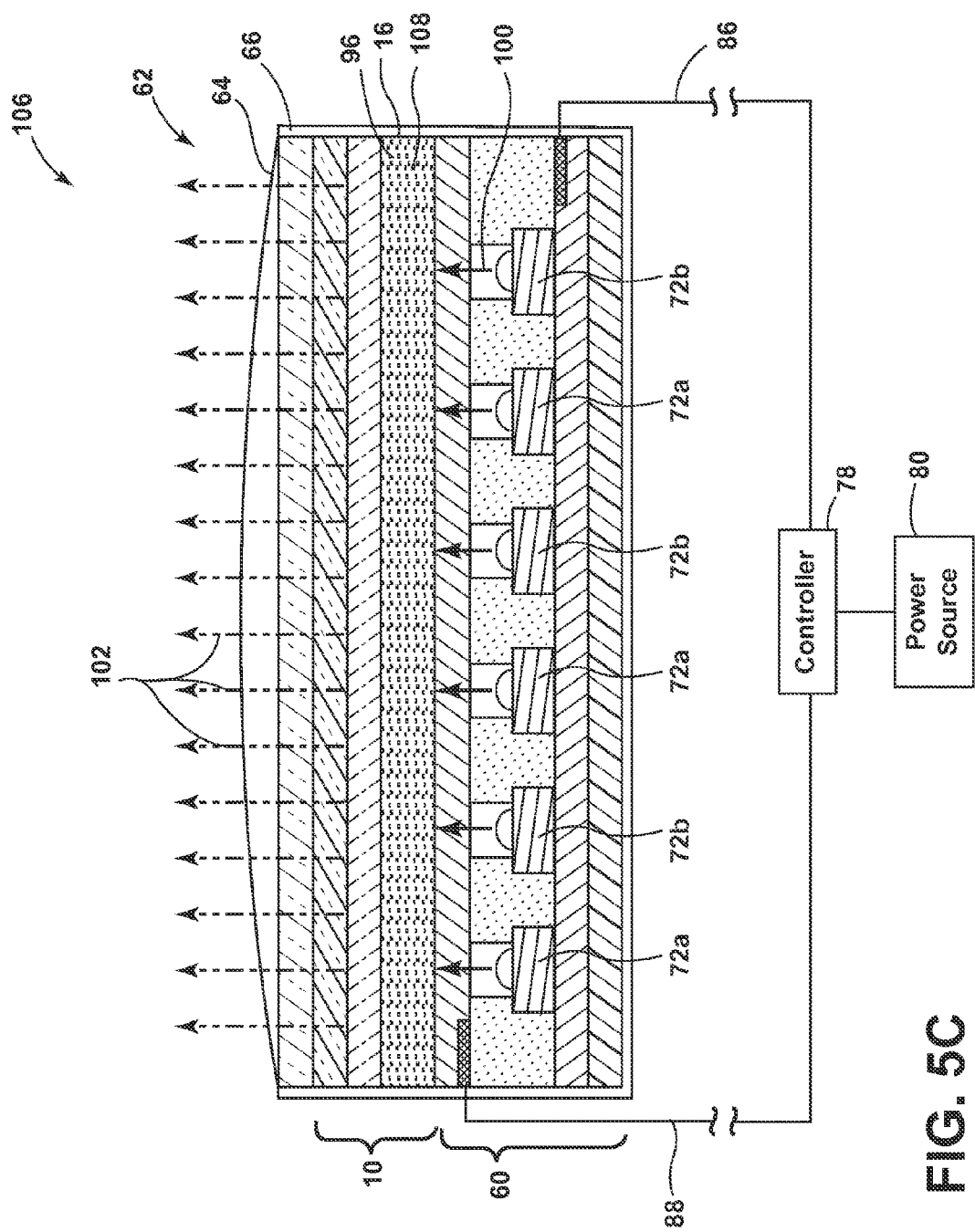
FIG. 5C is a cross-sectional view taken along line III-III of FIG. 2 illustrating an alternate light source, according to one embodiment.

Referring to FIG. 5C, a second energy conversion process 106 for generating multiple colors of light is illustrated according to one embodiment. For consistency, the second energy conversion process 106 is also described below using the light source 62 depicted in FIG. 5A. In this embodiment, the energy conversion layer 16 includes the first and second photoluminescent materials 96, 108 that are interspersed within the energy conversion layer 16. Alternatively, the photoluminescent materials 96, 108 may be isolated from each other if desired. Also, it should be appreciated that the energy conversion layer 16 may include more than two different photoluminescent materials 96, 108, in which case, the teachings provided below similarly apply. In one embodiment, the second energy conversion process 106 occurs by way of down conversion using blue, violet, and/or UV light as the source of excitation.

With respect to the presently illustrated embodiment, the excitation of photoluminescent materials 96, 108 is mutually exclusive. That is, photoluminescent materials 96, 108 are formulated to have non-overlapping absorption spectrums and Stoke shifts that yield different emission spectrums. Also, in formulating the photoluminescent materials 96, 108, care should be taken in choosing the associated Stoke shifts such that the converted light 102 emitted from one of the photoluminescent materials 96, 108, does not excite the other, unless so desired. According to one exemplary embodiment, a first portion of the LED sources 72a is configured to emit an inputted light 100 having an emission wavelength that only excites photoluminescent material 96 and results in the inputted light 100 being converted into a visible light 102 of a first color (e.g., white). Likewise, a second portion of the LED sources 72b, is configured to emit an inputted light 100 having an emission wavelength that only excites second photoluminescent material 108 and results in the inputted light 100 being converted into a visible light 102 of a second color (e.g., red). Preferably, the first and second colors are visually distinguishable from one another. In this manner, LED sources 72a and 72b may be selectively activated using the controller 78 to cause the photoluminescent structure 10 to luminesce in a variety of colors. For example, the controller 78 may activate only LED sources 72a to exclusively excite photoluminescent material 96, resulting in the viewable portion 64 illuminating in the first color. Alternatively, the controller 78 may activate only LED sources 72b to exclusively excite the second photoluminescent material 108, resulting in the viewable portion 64 illuminating in the second color.

Alternatively still, the controller 78 may activate LED sources 72a and 72b in concert, which causes both of the photoluminescent materials 96, 108 to become excited, resulting in the viewable portion 64 illuminating in a third color, which is a color mixture of the first and second color (e.g., pinkish). The intensities of the inputted light 100 emitted from each light source 62 may also be proportionally varied to one another such that additional colors may be obtained. For energy conversion layers 16 containing more than two distinct photoluminescent materials, a greater diversity of colors may be achieved. Contemplated colors include red, green, blue, and combinations thereof, including white, all of which may be achieved by selecting the appropriate photoluminescent materials and correctly manipulating their corresponding LED sources 72.

Figure 5D:
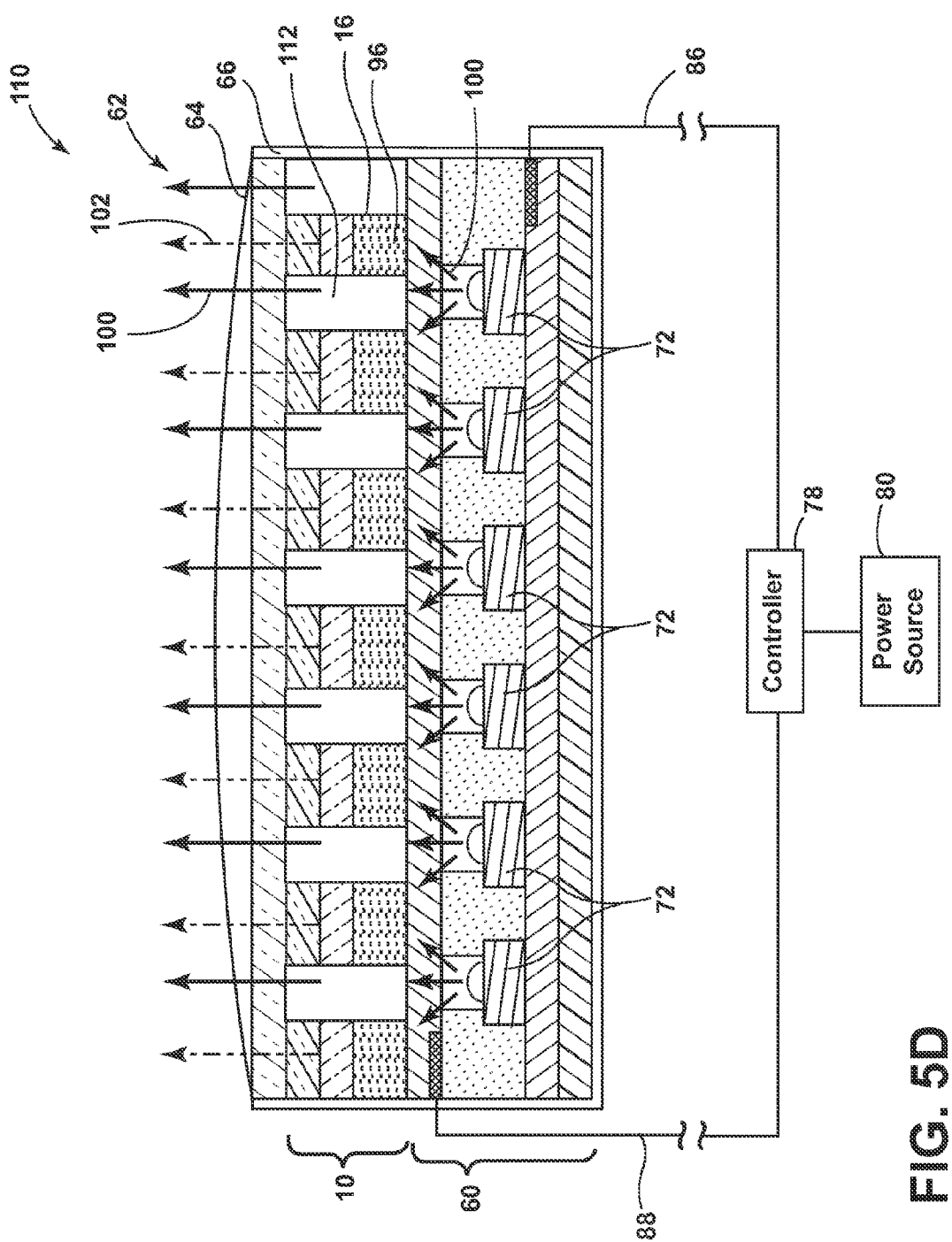
FIG. 5D is a cross-sectional view taken along line III-III of FIG. 2 illustrating a light source having a luminescent structure separated by light transmissive portions disposed on the light source, according to one embodiment.

Referring to FIG. 5D, a third energy conversion process 110 includes a light-producing assembly 60, such as the one described in reference to FIG. 5A, and a photoluminescent structure 10 disposed thereon is illustrated, according to an alternate embodiment. The photoluminescent structure 10 is configured to convert inputted light 100 received from LED sources 72 into a visible light 102 having a wavelength different than that associated with the inputted light 100. More specifically, the photoluminescent structure 10 is formulated to have an absorption spectrum that includes the emission wavelength of the inputted light 100 supplied from the LED sources 72. The photoluminescent material 96 is also formulated to have a Stokes shift resulting in the converted visible light 102 having an emission spectrum expressed in a desired color, which may vary per lighting application.

The photoluminescent structure 10 may be applied to only a portion of the light-producing assembly 60, for example, in a stripped manner. Between the photoluminescent structures 10 may be light transmissive portions 112 that allow inputted light 100 emitted from the LED sources 72 to pass therethrough at the first wavelength. The light transmissive portions 112 may be an open space, or may be a transparent or translucent material. The light 100 emitted through the light transmissive portions 112 may be directed from the light-producing assembly 60 towards a second photoluminescent structure 144 disposed proximate to the light-producing assembly 60. The second photoluminescent structure 144 may be configured to luminesce in response to the inputted light 100 that is directed through the light transmissive portions 112.

Referring to FIG. 5E, a fourth energy conversion process 114 for generating multiple colors of light utilizing the light-producing assembly 60, such as the one described in reference to FIG. 5A, and a photoluminescent structure 10 disposed thereon is illustrated. In this embodiment, the photoluminescent structure 10 is disposed over a top portion of the light-producing assembly 60. The excitation of photoluminescent material 96 is formulated such that a portion of inputted light 100 emitted from the LED sources 72 passes through the photoluminescent structure 10 at the first wavelength (i.e., the inputted light 100 emitted from the light source 62 is not converted by the photoluminescent structure 10). The intensity of the emitted light 100 may be modified by pulse-width modulation or current control to vary the amount of inputted light 100 emitted from the LED sources 72 that passes through the photoluminescent structure 10 without converting to a second, outputted 102 wavelength. For example, if the light source 62 is configured to emit light 100 at a low level, substantially all of the light 100 may be converted to the second wavelength 102. In this configuration, a color of light 102 corresponding to the photoluminescent structure 10 may be emitted from the light-producing assembly 60. If the light source 62 is configured to emit inputted light 100 at a high level, only a portion of the first wavelength may be converted by the photoluminescent structure 10. In this configuration, a first portion of the emitted light 100 may be converted by the photoluminescent structure 10 and a second portion of the light 100 may be emitted from the light-producing assembly 60 at the first wavelength towards additional photoluminescent structures 144 disposed proximately to the light source 62. The additional photoluminescent structures 144 may luminesce in response to the light 100 emitted from the light source 62.

According to one exemplary embodiment, a first portion of the LED sources 72, exemplarily shown as LED sources 72a is configured to emit an inputted light 100 having a wavelength that excites the photoluminescent material 96 within the photoluminescent structure 10 and results in the inputted light 100 being converted into a visible light 102 of a first color (e.g., white). Likewise, a second portion of the LED sources 72, exemplarily shown as LED sources 72c, is configured to emit an inputted light 100 having a wavelength that passes through the photoluminescent structure 10 and excites additional photoluminescent structures 144 disposed proximately to the lighting system 22 thereby illuminating in a second color. The first and second colors may be visually distinguishable from one another. In this manner, LED sources 72a and 72c may be selectively activated using the controller 78 to cause the lighting system 22 to luminesce in a variety of colors.

The light-producing assembly 60 may also include optics 116 that are configured to direct light 100 emitted from the LED sources 72a, 72c and the light 102 emitted from the photoluminescent structure 10 towards pre-defined locations. For example, light 100 emitted from the LED sources 72a, 72c and the photoluminescent structure 10 may be directed and/or focused towards a desired feature and/or location proximate to the light source 62. It should be appreciated that the lighting system 22 may utilize any lighting device, such as an LED, to accomplish the same lighting techniques as described herein.

Figure 6:
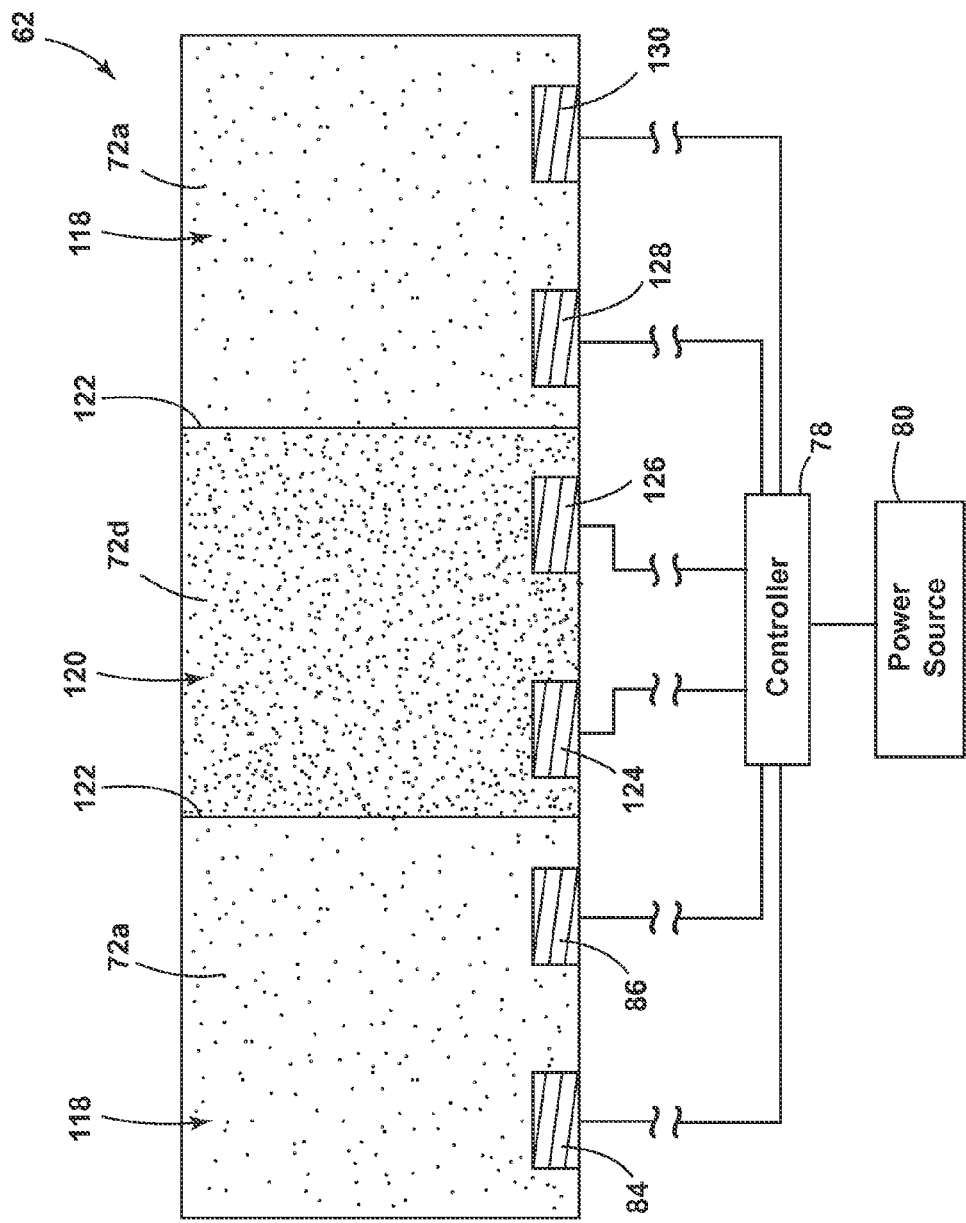
FIG. 6 illustrates a top view of a light-producing assembly, according to one embodiment, having varying types and concentrations of LED sources transversely along the light-producing assembly.

Referring to FIG. 6, a light-producing assembly 60, according to one embodiment, is illustrated from a top view having varying types and concentrations of LED sources 72a, 72d transversely along the light-producing assembly 60. As illustrated, a first portion 118 of the light-producing assembly 60 includes LED sources 72d that are configured to emit an inputted light 100 having an emission wavelength in a first color (e.g., white) spectrum. Likewise, a second portion 120 of the light-producing assembly 60 includes LED sources 72d that are configured to emit an inputted light 100 having an emission wavelength in a second color (e.g., red) spectrum. The first and second portions 118, 120 of the light-producing assembly 60 may be separated by insulative, or non-conductive, barriers 122 from proximately disposed portions through any means known in the art such that each portion 118, 120 may be illuminated independently of any other portion 118, 120. Further, each portion 118, 120 disposed within the light-producing assembly 60 may include a respective bus bar 82, 84, 124, 126, 128, 130 coupled to the controller 78 and configured to illuminate each respective portion 118, 120.

Preferably, the first and second colors are visually distinguishable from one another. In this manner, LED sources 72a and 72d may be selectively activated using the controller 78 to cause the LED sources 72a, 72d to illuminate in a variety of colors. For example, the controller 78 may activate only LED sources 72a to exclusively illuminate a portion 118 of the light-producing assembly 60 in the first color. Alternatively, the controller 78 may activate only LED sources 72d to exclusively illuminate a portion 120 of the light-producing assembly 60 in the second color. It should be appreciated that the light-producing assembly 60 may include any number of portions 118, 120 having varying LED sources 72a, 72d that may illuminate in any desired color. Moreover, it should also be appreciated that the portions having varying LED sources 72a, 72d may be orientated in any practicable manner and need not be disposed adjacently. As described above, a photoluminescent structure 10 may be disposed on a portion of the light-producing assembly 60. If desired, any of the LED sources 72a, 72d may be utilized for exciting any photoluminescent material 92 disposed proximately to and/or on the light source 62.

The semiconductor ink 74 may also contain various concentrations of LED sources 72a, 72d such that the density of the LED sources 72a, 72d, or number of LED sources 72a, 72d per unit area, may be adjusted for various lighting applications. In some embodiments, the density of LED sources 72a, 72d may vary across the length of the light source 62. For example, a central portion 120 of the light-producing assembly 60 may have a greater density of LED sources 72 than peripheral portions 118, or vice versa. In such embodiments, the light source 62 may appear brighter or have a greater luminance in order to preferentially illuminate pre-defined locations. In other embodiments, the density of LED sources 72a, 72d may increase or decrease with increasing distance from a preselected point. In some embodiments, the LED sources 72a, 72d and semiconductor ink 74 may be sourced from Nth Degree Technologies Worldwide Inc.

Figure 8:
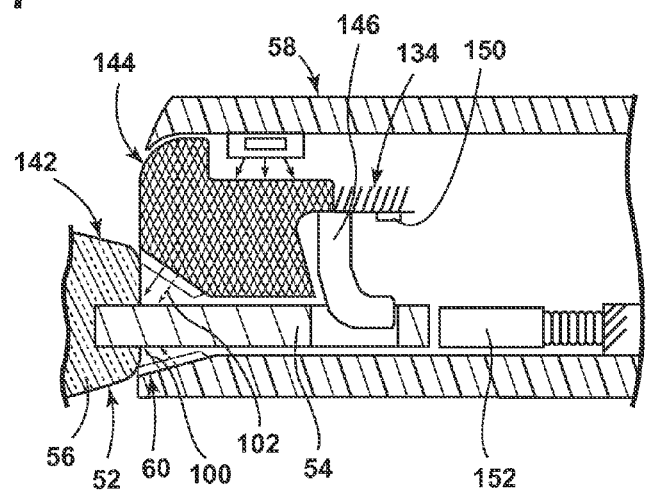
FIG. 8 is a cross-sectional view taken along line VII-VII of FIG. 4A illustrating the lighting system with the seatbelt assembly in the latched condition utilizing a printed LED.

As illustrated in FIGS. 7 and 8, the lighting system 22 may provide assistance in the coupling of the seatbelt assembly 24 components in otherwise poor lighting conditions. With reference to FIG. 7, the seatbelt assembly 24 is shown in the unlatched condition as the tongue member 52 is to be received in the cavity of the seatbelt buckle 58 and latched to the latch mechanism 134 disposed within the housing 132. As illustrated, the seatbelt assembly 24 includes a lighting system 22 for use in asserting the vehicle occupant locate the tongue member 52 through the use of the photoluminescent portion 142. The lighting system 22 includes a light source 62 generally disposed near the lower side of the seatbelt buckle 58. The light source 62 may be configured to direct light 100 emitted from the light source 62 toward the photoluminescent portions 142, 144 and/or the vehicle cabin. For example, the light source 62 may be disposed within the buckle housing 132 such that the light 100 emitted from the light source 62 is focused outwardly from the receiving slot 136 and towards the pushbutton 140 simultaneously. The outwardly focused light may illuminate a plurality of features within the vehicle 26.

In response to the light 100 at a first wavelength (e.g., blue light) emitted from the light source 62 being received by the first photoluminescent portion 142, the energy conversion layer 16 may become excited and emit light 102 at a second wavelength. The light 102 at a second wavelength may comprise a plurality of wavelengths to generate a significantly white light. The light 100 emitted from the light source 62 may also be further directed from the light source 62 towards one or more additional photoluminescent portions 144 applied as a coating to and/or disposed in a matrix (e.g. the polymer matrix) on any number of the plurality of components or features. For example, the second photoluminescent portion 144 may be incorporated in the pushbutton 140. In response to receiving light 100 at the first wavelength, each of the plurality of photoluminescent portions 142, 144 may become excited. The excitation may cause the each photoluminescent portion 142, 144 to emit light at different wavelengths from the light 100 emitted from the light source 62.

In order to increase the amount of light directed towards a photoluminescent portion 142, 144, a reflective material 148 may be disposed on a portion of the housing 132 that is configured to direct light towards a desired location (e.g., the pushbutton 140).

Referring now to FIG. 8, the seatbelt assembly 24 is shown in the latched condition as the tongue member 52 is received in the cavity of the seatbelt buckle 58 and latched to the latch mechanism 134 disposed within the housing 132. It is contemplated that the latch mechanism 134 may comprise any structure capable of cooperating with the tongue member 52 to releasably latch the tongue member 52 to the seatbelt buckle 58. Further, the pushbutton actuator 146 may be of any form capable of unlatching or releasing the tongue member 52 from the latch mechanism 134. As shown in the latched condition, the seatbelt assembly 24 provides for the seatbelt buckle 58 to have the upper side generally accessibly to the vehicle occupant, such that the pushbutton 140 can easily be reached and actuated to unlatch the seatbelt assembly 24. According to one embodiment, any light source 62 within the lighting system 22 may illuminate after the vehicle 26 door is placed in an ajar position or when a seat sensor detects an occupant disposed on the specific seat 30. Further, it is contemplated that the light source 62 may be automatically programmed to turn off when the seatbelt assembly 24 is in the latched condition.

A pushbutton 140 may be employed to unlock the tongue member 52 from the cavity when the pushbutton 140 is depressed. In order to release the tongue member 52 from the seatbelt assembly 24, the pushbutton 140 may utilize a biasing member (not shown) or other mechanism known in the art. It should be appreciated that the mechanism 134 illustrated in FIGS. 7-8 is presented as a non-limiting example and any other suitable mechanism for releasably interlocking the tongue member 52 may be used. The seatbelt assembly 24 may include any other components or parts capable of releasably interlocking with the tongue member 52.

Still referring to FIG. 8, the seatbelt buckle 58 includes light-producing assemblies 60 disposed on either side of a seatbelt tongue receiving slot 136. The light-producing assemblies 60 may illuminate the receiving slot 136 and/or direct light at a first wavelength 100 towards a second seatbelt component, such as the tongue member 52.

As shown in FIG. 8, a second light source 62 is disposed proximate the pushbutton 140 on the buckle 58. A second photoluminescent material may be disposed within the pushbutton 140 that is configured to illuminate in response to the illumination of the second light source 62. According to one embodiment, any light source 62 may illuminate when occupants enter a vehicle 26, such that the pushbutton(s)

140, receiving slot 136, and/or tongue member(s) 52 are illuminated thereby providing assistance in locating the components of the seatbelt assembly 24. When the vehicle 26 senses that an occupant may be leaving the vehicle 26, the lighting system 22 may be configured to illuminate the second light source 62 to assist the occupants in locating the pushbutton 140 of the seatbelt buckle 58.

Accordingly, the lighting assembly may further include a latch sensor 150 operatively connected to the assembly and configured to detect whether the tongue member 52 is interlocked with the assembly. The latch sensor 150 may be mounted to any portion of the assembly. In one example, the latch sensor 150 detects whether the tongue member 52 is in the unlatched position or latched position by sensing the position of the buckle portion 54 of the tongue member 52. Alternatively, the latch sensor 150 may be an optical proximity sensor configured to detect the position of the tongue member 52. In another embodiment, the latch sensor 150 is a mechanical switch that switches between two states, i.e. turns on/off, as the tongue member 52 moves between the first and second positions. The latch sensor 150 includes any necessary circuitry that allows it to act in a digital mode. Any suitable device or method may be employed by the latch sensor 150.

In alternate embodiments, the light source 62, or light-producing assemblies may be placed in any other practicable location not discussed herein. For example, a light producing assembly may be disposed on an ejector member 152 that contacts the buckle portion 54 of the tongue member 52 in the latched condition.

Figure 9:
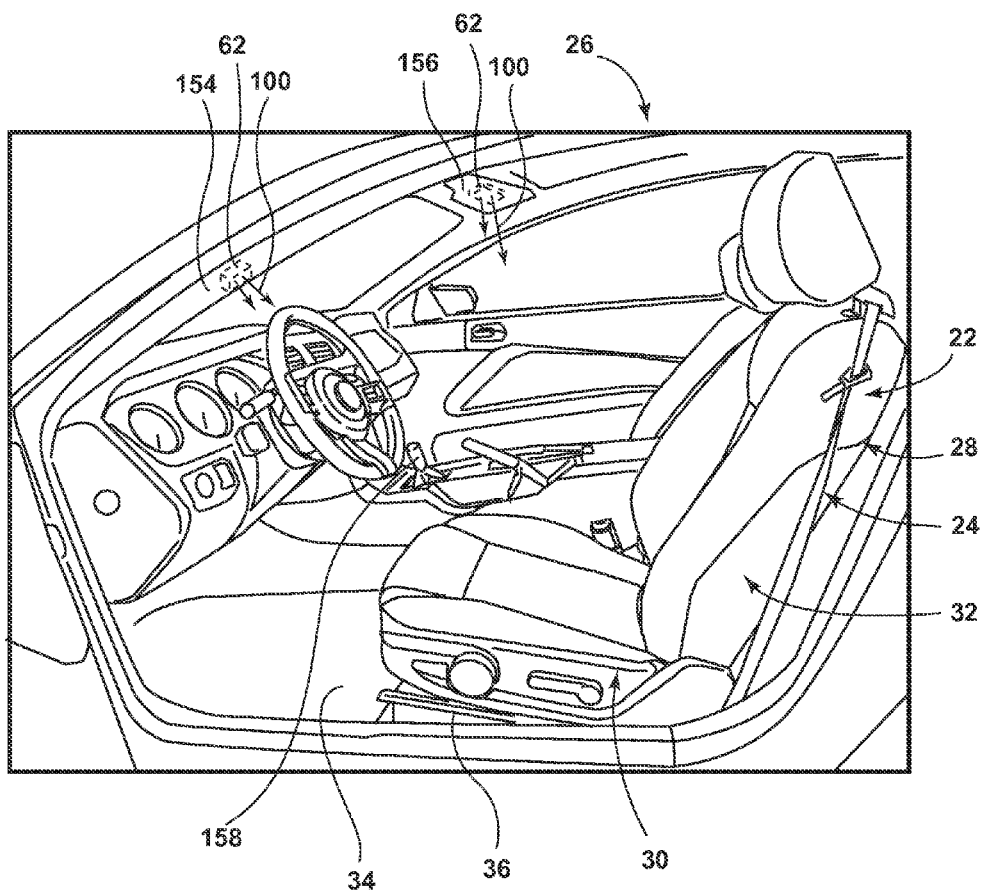
FIG. 9 is a perspective view of the vehicle having a light source disposed proximately to the driver's seat and emitting light towards the seatbelt assembly components.

Referring to FIG. 9, an alternate embodiment of the lighting system 22 is illustrated having a light source 62 disposed with an interior vehicle cabin component and light emitted therefrom is projected towards the seatbelt components. For example, the light source 62 may be disposed within the A-pillar 154 or a visor 156 disposed within the vehicle 26. It is also contemplated that the light source 62 may excite additional photoluminescent portions 144 disposed within the vehicle 26. For example, the light source 62 may illuminate the seatbelt assembly 24, as described herein and the gear shift lever contemporaneously.

The buckle 58 and/or tongue member 52 may illuminate light in varying colors based on latched or unlatched condition. For example, each buckle 58 and/or tongue member 52 may illuminate in a first color when unlatched and a second color when latched so that the driver may identify which occupants are properly restrained within the vehicle 26. Alternatively, the driver's buckle 58 may illuminate in a first color until the vehicle 26 senses that each passenger within the vehicle 26 is restrained to provide an efficient identification of proper restraint by all passengers. It is contemplated that any sensors known in the art may be utilized for sensing when vehicle seats are utilized by occupants.

Figure 10:
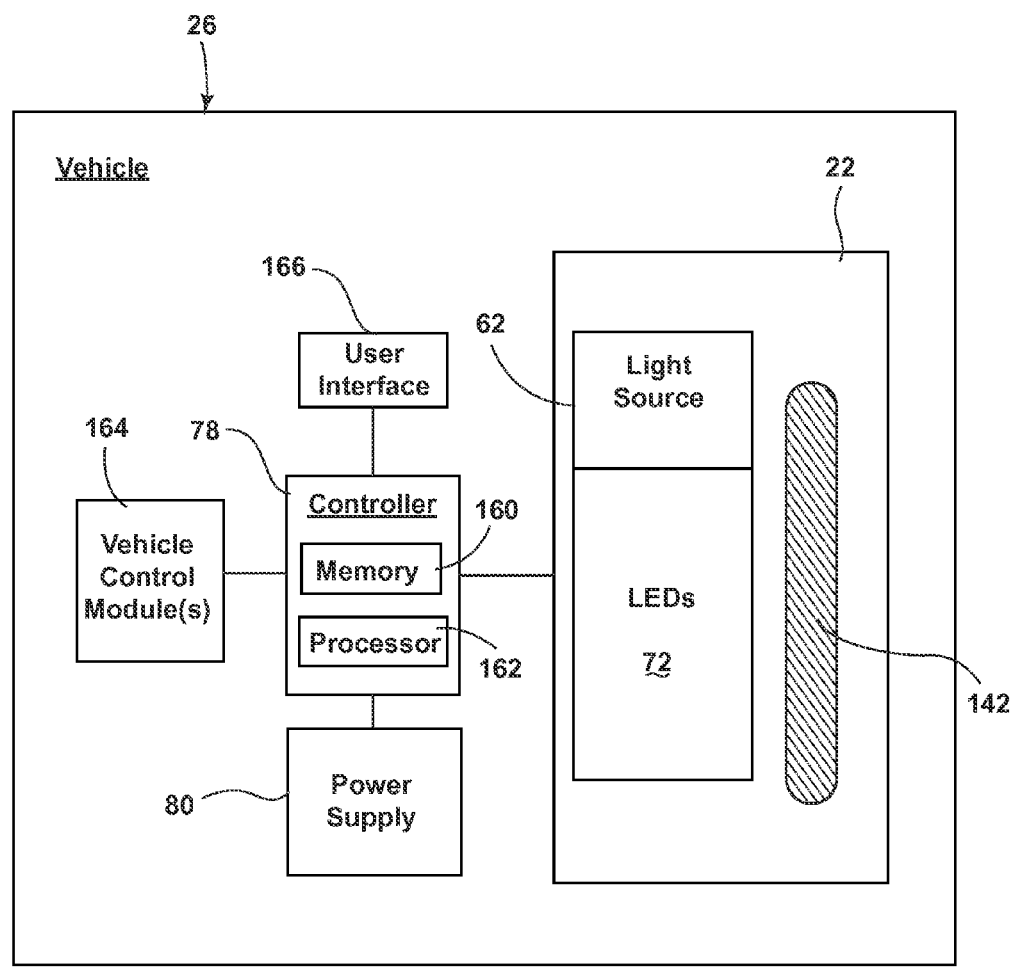
FIG. 10 is a block diagram of the vehicle and the illuminated lighting system.

Referring to FIG. 10, a block diagram of a vehicle 26 is shown in which the lighting system 22 is implemented. The lighting system 22 includes a controller 78 in communication with the light source 62. The controller 78 may include memory 160 having instructions contained therein that are executed by a processor 162 of the controller 78. The controller 78 may provide electrical power to the light source 62, or to a respective bus bar 82, 84, via a power source 80 located onboard the vehicle 26. In addition, the controller 78 may be configured to control the light output of each light source 62 based on feedback received from one or more vehicle control modules 164 such as, but not limited to, a body control module, engine control module, steering control module, brake control module, the like, and/or a combination thereof. By controlling the light output of the light source 62, the lighting system 22 may illuminate in a variety of colors and/or patterns to provide an aesthetic appearance, or may provide vehicle 26 information to an intended observer. For example, when a vehicle 26 door is ajar, the light-producing assembly may illuminate and/or features within the vehicle 26 may be illuminated or excited.

In operation, each photoluminescent portion 142 may exhibit a constant unicolor or multicolor illumination. For example, the controller 78 may prompt the light source 62 to emit only the first wavelength of light via an LED to cause a photoluminescent portion 142 to illuminate in the first color (e.g., white). Alternatively, the controller 78 may prompt the light source 62 to emit only the second wavelength of light via the LED to cause the photoluminescent portions 142, 144 to illuminate in the second color (e.g., red). Alternatively still, the controller 78 may prompt the light source 62 to simultaneously emit the first and second wavelengths of light to cause the photoluminescent portions 142, 144 to illuminate in a third color (e.g. pinkish) defined by an additive light mixture of the first and second colors. Moreover, additional photoluminescent portions 142, 144 may be added to the lighting system 22 that converts the light emitted from the light source 62 to a different wavelength. Alternatively still, the controller 78 may prompt the light source 62 to alternate between periodically emitting the first and second wavelengths of light to cause the photoluminescent portion 142 to periodically illuminate by alternating between the first and second colors. The controller 78 may prompt the light source 62 to periodically emit the first and/or second wavelengths of light at a regular time interval and/or an irregular time interval.

In another embodiment, the lighting system 22 may include a user interface 166. The user interface 166 may be configured such that a user may control the wavelength of light that is emitted by the LEDs and/or the LEDs that are illuminated. Such a configuration may allow a user to control which features are illuminated to assist in locating a desired feature. The user interface 166 may be disposed within the vehicle 26 cabin or on any surface that is accessible to the user during utilization of the lighting system 22 described herein. The user interface 166 may use any type of control known in the art for control the light source 62, such as, but not limited to, proximity sensors.

With respect to the above examples, the controller 78 may modify the intensity of the emitted first and second wavelengths of light by pulse-width modulation or current control. In some embodiments, the controller 78 may be configured to adjust a color of the emitted light 100 by sending control signals to adjust an intensity or energy output level of the light source 62. For example, if the light source 62 is configured to output the first emission at a low level, substantially all of the inputted light may be converted to the outputted, visible light. If the light source 62 is configured to emit inputted light at a high level, only a portion of the inputted light may be converted to the outputted light by the photoluminescent portion 142. In this configuration, a color of light corresponding to mixture of the inputted light and the outputted light may be output as the emitted light 100. In this way, each of the controllers 78 may control an output color of the emitted light 100.

Though a low level and a high level of intensity are discussed in reference to the inputted light 100, it shall be understood that the intensity of the inputted light 100 may be varied among a variety of intensity levels to adjust a hue of the color corresponding to the emitted light 100, 102 from the lighting system 22. As described herein, the color of the outputted light may be significantly dependent on the particular photoluminescent structures utilized in the photoluminescent portion 142. Additionally, a conversion capacity of the photoluminescent portion 142 may be significantly dependent on a concentration of the photoluminescent structures utilized in the photoluminescent portion 142. By adjusting the range of intensities that may be emitted from the light source 62, the concentration and proportions of the photoluminescent structures in the photoluminescent portion 142 and the types of photoluminescent materials utilized in the photoluminescent portion 142 discussed herein may be operable to generate a range of color hues of emitted light by blending the inputted light 100 with the outputted light 102. It is also contemplated that the intensity of each light source 62 may be varied simultaneously, or independently, from any number of other light sources 62.

Accordingly, an illuminated seatbelt assembly lighting system has been advantageously described herein. The lighting system may provide various benefits including a simple and cost-effective means to produce a variety of illumination that may be used as a styling feature and/or to assist an occupant in the usage of the illuminated seating assembly.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seatbelt assembly, comprising:
   a buckle configured to couple to a tongue member;
   a first light source disposed within the buckle;
   a first photoluminescent structure disposed on the buckle and configured to luminesce in response to excitation by the first light source; and
   a second photoluminescent structure disposed on the tongue member and configured to luminesce in response to light emitted by a second light source disposed on an exterior portion of the buckle.

2. The seatbelt assembly of claim 1, wherein the second light source comprises a plurality of printed LEDs.

3. The seatbelt assembly of claim 2, wherein the first photoluminescent structure comprises at least one photoluminescent material configured to down convert an inputted light received from at least a portion of the first light source into a visible light that is outputted to a viewable portion.

4. The seatbelt assembly of claim 3, wherein the inputted light comprises one of blue light, violet light, and UV light.

5. The seatbelt assembly of claim 1, wherein the second light source is disposed on a tongue receiving slot.

6. The seatbelt assembly of claim 1, wherein the buckle includes a pushbutton actuator disposed thereon for releasing a tongue member from the latch mechanism when the buckle and the tongue member are in a latched condition and the first photoluminescent structure is disposed on the pushbutton.

7. The seatbelt assembly of claim 1, wherein the first or second light sources emit excitation light at a first intensity when the buckle and the tongue member are in an unlatched condition and at a second intensity when the buckle and the tongue member are in a latched condition.

8. A seatbelt assembly for a vehicle, comprising:
   a tongue member slidably disposed along a retractable belt webbing;
   a seatbelt buckle having a housing containing a latch mechanism which releasably latches the tongue member and seatbelt buckle; and
   a luminescent structure on the tongue member and configured to luminesce in response to excitation by light emitted by a light source within the housing when the tongue member is disposed in close proximity to the light source.

9. The seatbelt assembly for a vehicle of claim 8, wherein the light source comprises a printed LED.

10. The seatbelt assembly for a vehicle of claim 9, wherein the luminescent structure comprises at least one luminescent material configured to down convert an inputted light received from at least a portion of the printed LED into a visible light that is outputted to a viewable portion.

11. The seatbelt assembly for a vehicle of claim 10, wherein the inputted light comprises one of a blue light, violet light, and UV light.

12. The seatbelt assembly for a vehicle of claim 8, wherein a plurality of luminescent structures are separated by a plurality of light transmissive portions such that a first portion of light emitted from the light source is converted to a second wavelength and a second portion of light emitted from the light source passes through a light transmissive portion.

13. The seatbelt assembly for a vehicle of claim 8, further comprising:
   a reflective material within the housing configured to direct light emitted from the light source towards a desired location.

14. A seatbelt assembly, comprising:
   a tongue member disposed on a retractable belt webbing, the belt webbing affixed to a vehicle structure at each end:
   a buckle having a housing containing a latch mechanism; and
   one or more light sources disposed on the buckle and directed towards a photoluminescent structure disposed on the tongue member, wherein the photoluminescent structure is configured to luminesce in response to excitation by the one or more light sources.

15. The seatbelt assembly for a vehicle of claim 14, wherein the one or more light sources comprise a plurality of printed LEDs.

16. The seatbelt assembly for a vehicle of claim 15, wherein the photoluminescent structure comprises at least one photoluminescent material configured to convert an inputted light received from at least a portion of the one or more light sources into a visible light.

17. The seatbelt assembly of claim 14, wherein the housing includes a pushbutton actuator disposed thereon for releasing a tongue member from the latch mechanism when the seatbelt buckle and the tongue member are in a latched condition and a photoluminescent structure is disposed on the pushbutton.

18. The seatbelt assembly for a vehicle of claim 16, wherein the inputted light comprises one of blue light, violet light, and UV light.

19. The seatbelt assembly for a vehicle of claim 14, wherein the one or more light sources emits visible and non-visible excitation light from the buckle.

20. The seatbelt assembly for a vehicle of claim 14, further comprising a controller for controlling an activation state of the one or more light sources in response to at least one vehicle-related condition.

\* \* \* \* \*